United States Patent
Gilpin et al.

(10) Patent No.: US 12,074,441 B2
(45) Date of Patent: Aug. 27, 2024

(54) SYSTEMS AND METHODS FOR AUTOMATIC TRANSFER SWITCH LOAD CONTROL

(71) Applicant: Cummins Power Generation Inc., Minneapolis, MN (US)

(72) Inventors: Jacob R. Gilpin, Elko New Market, MN (US); Andrew Novak, Minneapolis, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 226 days.

(21) Appl. No.: 16/862,040

(22) Filed: Apr. 29, 2020

(65) Prior Publication Data

US 2021/0344219 A1    Nov. 4, 2021

(51) Int. Cl.
*H02J 3/14* (2006.01)
*H02J 9/06* (2006.01)

(52) U.S. Cl.
CPC ............... *H02J 3/14* (2013.01); *H02J 9/068* (2020.01)

(58) Field of Classification Search
CPC .... H02J 3/38; H02J 9/061; H02J 9/068; H02J 3/14; H02J 3/06; H02J 2310/60; H02J 3/007; H02J 3/005; H02J 1/084
See application file for complete search history.

(56) References Cited

U.S. PATENT DOCUMENTS

| | | | |
|---|---|---|---|
| 5,414,640 A | 5/1995 | Seem | |
| 8,222,548 B2 | 7/2012 | Espeut, Jr. | |
| 10,879,727 B1* | 12/2020 | Cooper | H02J 9/062 |
| 2003/0075982 A1 | 4/2003 | Seefeldt | |
| 2005/0141154 A1 | 6/2005 | Consadori et al. | |
| 2010/0219808 A1* | 9/2010 | Steckley | G01R 19/2513 324/76.77 |
| 2010/0244563 A1* | 9/2010 | Fleck | H02H 3/46 307/35 |
| 2011/0220229 A1* | 9/2011 | Chen | A61H 33/60 137/624.11 |
| 2015/0333520 A1* | 11/2015 | Ahn | H02J 3/14 307/24 |
| 2016/0013646 A1 | 1/2016 | Akerson | |
| 2016/0204651 A1* | 7/2016 | Pancheri | H02J 9/061 307/23 |
| 2016/0226235 A1* | 8/2016 | Lathrop | H02J 1/10 |
| 2016/0329713 A1* | 11/2016 | Berard | H02M 5/04 |
| 2017/0033560 A1* | 2/2017 | Berdner | H02J 13/00002 |
| 2019/0379237 A1 | 12/2019 | Lu et al. | |
| 2021/0281080 A1* | 9/2021 | Danielsen | H02J 9/06 |

OTHER PUBLICATIONS

International Search Report and Written Opinion for International Application No. PCT/US2021/028815, mail date Jul. 12, 2021, 16 pages.

* cited by examiner

*Primary Examiner* — Rexford N Barnie
*Assistant Examiner* — Rasem Mourad
(74) *Attorney, Agent, or Firm* — Foley & Lardner LLP

(57) ABSTRACT

Systems and methods for managing loads on a power grid are provided. The load control system includes one or more energy sources connected to a common bus and a first device connected in series between the common bus and a first load. The first device may be an automatic transfer switch. The first device may include switching hardware configured to connect and disconnect the first load from the common bus and a load control circuit configured to cause the first load to disconnect from the common bus after a pre-determined amount of time detecting a trigger.

20 Claims, 4 Drawing Sheets

SYSTEMS AND METHODS FOR AUTOMATIC TRANSFER SWITCH LOAD CONTROL

TECHNICAL FIELD

The present disclosure relates generally to electric power transmission. More particularly, the present disclosure relates to systems and methods for controlling loads on a power grid using one or more automatic transfer switches.

BACKGROUND

On a power or utility grid, there may be one or more sources of energy (e.g., generators, wind turbines, gas turbines, steam turbines) that are designed to supply energy to one or more loads. For example, a grid (e.g., micro-grid, utility grid, etc.) may include two or more generators in parallel to three or more loads. In some applications, it may be desirable to keep the voltage and frequency of the electricity received by the loads within a pre-determined range. However, the number or size of loads may change at different times (e.g., a motor may be started or turned off, an additional load may be added, etc.) and the change in load effects the two or more generators (e.g., sources) that then need to adjust their operation (e.g., and thereby their output) in order to maintain the voltage and frequency within the pre-determined range. In some applications, particular loads may either need to be disconnected or connected to the two or more generators in order for the voltage and frequency to be maintained.

SUMMARY

One implementation is related to a system, the system includes one or more energy sources connected to one or more loads via respective devices. In some embodiments, each of the respective devices include an automatic transfer switch (ATS). For example, the system may include one or more energy sources connected to a common bus, a first ATS connected to the common bus and a first load, and a second ATS connected to the common bus and a second load. The first ATS includes switching hardware and a load control circuit. The load control circuit may include one or more processors that are configured to detect a trigger on the common bus, the trigger indicative of a condition, and in response to detecting the trigger for a first pre-determined amount of time, cause the first load to electrically disconnect from the common bus. The first pre-determined amount of time may be based on a first priority of the first load. Similarly, the second ATS includes switching hardware and a load control circuit. The load control circuit may include one or more processors that are configured to detect a trigger on the common bus and, in response to detecting the trigger for a second pre-determined amount of time, cause the second load to electrically disconnect from the common bus. The second pre-determined amount of time may be based on a priority of the second load.

In some embodiments, the first pre-determined amount of time is less than the second pre-determined amount of time, and the first priority is less than the second priority. In some embodiments, the load control circuit of the first ATS is further configured to monitor one or more electrical parameters present on the common bus. In some embodiments, the load control circuit of the second ATS is further configured to monitor one or more electrical parameters present on the common bus. In some embodiments, the trigger comprises a frequency or voltage of electricity on the common bus falling below a threshold. In some embodiments, the first priority is manually programmed within a memory of the first ATS, and the priority of the second load is programmed into a memory of the second ATS.

Another implementation is related to a device configured to connect and disconnect a load from a system in order to control loads on a system. The device includes a first terminal configured to connect to an output of one or more energy sources, a second terminal configured to connect to a load, switching hardware configured to connect the first terminal to the second terminal, and a load control circuit. The load control circuit may include one or more processors or logic hardware that is configured to detect a condition on the first terminal and, in response to detecting the condition for a pre-determined amount of time, cause the switching hardware to electrically disconnect the first terminal from the second terminal. In some embodiments, the pre-determined amount of time is based on a priority of the load.

The load control circuit may be further be configured to determine the pre-determined amount time based the priority of the load. The priority may be based on an importance of the load. In some embodiments, the load control circuit is further configured to determine that the condition is still present and, in response to determining that the condition is still present, determine that the timer exceeds the pre-determined amount of time. In some embodiments, the load control circuit is further configured to determine that the condition is no longer present before the timer exceeds the pre-determined amount of time and, in response to determining that the condition no longer present, stop and reset the timer. The condition may include detecting a magnitude of power violating a threshold, and wherein the threshold is stored within a memory of the device.

Another implementation is related to a method of controlling load conditions on a power grid. The method includes detecting, via a first device, a condition on a common bus of a power grid, where the first device is connected in series to the common bus and a first load and, in response to detecting the condition for a pre-determined amount of time, disconnecting, via the first device, the first load from the common bus. The pre-determined amount of time may be based on a priority of the first load on the power grid.

The method may further include detecting, via a second device, the condition on the common bus of a power grid, the second device is connected in series to the common bus and a second load and, in response to detecting the condition for a second pre-determined amount of time, disconnecting, via the second device, the second load from the common bus. In some embodiments, the second pre-determined amount of time is based on a priority of the second load on the power grid. In some embodiments, the condition comprises a frequency of electricity on the common bus falling below a threshold. In some embodiments, the condition comprises a voltage of electricity on the common bus falling below a lower threshold or exceeding an upper threshold.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
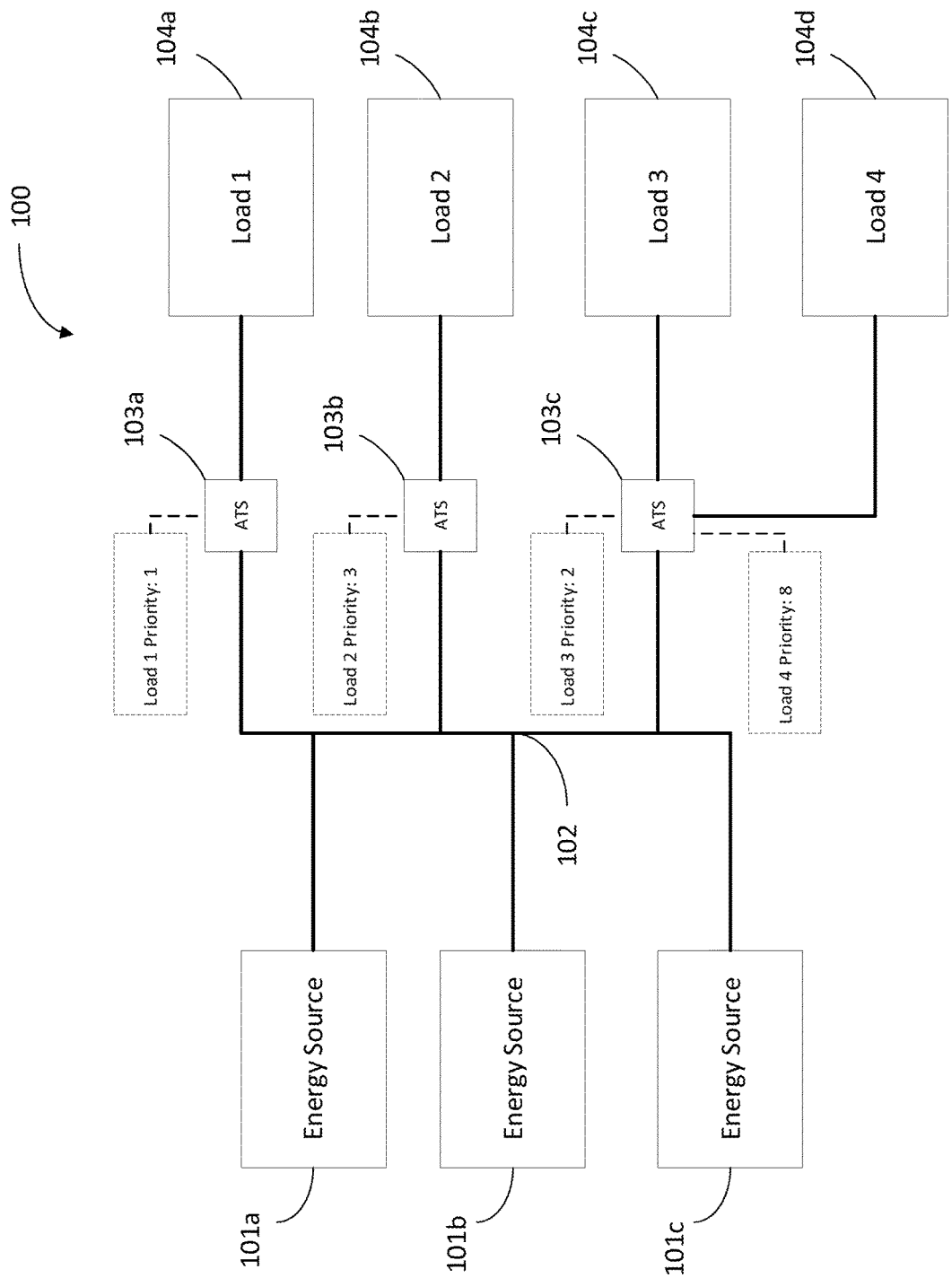
FIG. 1 is a block diagram illustrating a load control system according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for load control using an automatic transfer switch (ATS) is provided according to exemplary embodiments. A load control system includes one or more energy sources, one or more loads, and an ATS corresponding to each of the one or more loads. The one or more energy sources are configured to provide power to one or more loads. The one or more energy sources may be connected in parallel such that the respective output terminals of the energy sources share a common bus. In some embodiments, the respective output terminals of the energy sources may be connected to the common bus via a transfer switch, fuse, ATS, or other contact that may be used to electrically connect or disconnect the respective generator from the common bus. Each of the one or more loads may be connected to the common bus via a respective device (e.g., an ATS) that is wired in series between the terminals of the load and the common bus.

The ATS is configured to monitor electrical parameters at a first terminal of the ATS (e.g., at the common bus) in order to detect a trigger. The electrical parameters may include a voltage, a current, a frequency, a power magnitude (e.g., in kilowatts), or other electrical parameter at the first terminal (e.g., and/or at the common bus). The trigger may include one or more of the electrical parameters being outside a pre-defined range, exceeding an upper threshold, or falling below a lower threshold. The trigger may indicate that the electrical conditions on the common bus (e.g., and thereby the energy sources) are indicative of a fault condition (e.g., such as an overload condition). The overload condition may be caused by a substantial increase in a total load on the common bus (e.g., the addition of loads or an increase in power consumption by a load), a fault in one of the loads, or other fault in the system. In response to detecting the trigger, the ATS may start a timer and if the trigger (e.g., the overload condition) is still present after a pre-defined amount of time, then the ATS may disconnect a respective load from the common bus. The pre-defined amount of time may be based on a priority of the load. For example, if a respective load of a first ATS has a high priority (e.g., a priority of 1), then the pre-defined amount of time may be longer than a second ATS that is connected to a lower priority (e.g., a priority of 2). The priority level or an indication of the priority level may be programmed, set, or updated by a user into each respective ATS. In some embodiments, the load control system may have eight priority levels or more.

Thus, when a fault condition (e.g., an overload condition) is present on the common bus, the ATS may detect the fault condition via detecting the trigger at a respective terminal. The ATS will then wait for a pre-defined time, and if the trigger or fault condition is still present after the pre-defined time, then the ATS will disconnect the load from the common bus. In some embodiments, the pre-defined time is based on a pre-defined priority of the load (e.g., load priority) connected to the ATS. For example, a lower priority load may be disconnected from the common bus at a first time and, if the fault condition no longer exists at the common bus, then no other loads will be disconnected from the common bus (e.g., because the trigger is not present before the pre-defined time of the higher priority load is reached). In this way, each individual ATS is able to provide load control within the load control system in a predictable and controlled manner without communication between the loads and generators and without the need of a centralized or supervisory controller, which reduces the amount of time and expenses associated with installing and maintaining a load control system.

Referring to FIG. 1, a block diagram illustrating a load control system 100 is shown according to an exemplary embodiment. The load control system 100 includes one or more energy sources 101a-c, a common bus 102, and one or more loads 104a-d connected to the common bus 102 via a respective ATS 103a-c.

The energy sources 101a-c may be connected to the common bus 102 in parallel. That is, the one or more energy sources 101a-c each are configured to electrically connect to the common bus 102 (e.g., common terminal or common terminals depending upon type of power and particular applications). The respective output terminals of the energy sources 101a-c may be connected to the common bus via a transfer switch, fuse, ATS, or other contact that may be used to electrically connect and disconnect the respective generator from the common bus 102. An energy source may include a generator, a generator set, a turbine, power plant, solar power, battery device, or any device or system that is configured to supply electrical power to a load.

The loads 104a-d are connected to the common bus 102 with a respective ATS 103a-c in connected series between the common bus 102 and the respective one or more loads 104a-d. In this way, each of the loads 104a-d may receive electrical power from the energy sources 101a-c via the common bus 102 when a respective ATS 103a-c is electrically and selectively connecting the respective load to the common bus. For example, a first ATS 103a is configured to open and close circuits or contacts in order to electrically disconnect and connect a first load 103a from the common bus 102. Similarly, a second ATS 103b is configured to electrically connect and disconnect a second load 104b to the common bus 102, a third ATS 103c is configured to electrically connect and disconnect a third load 104c to the common bus 102 also configured to electrically connect and disconnect a fourth load 104d to the common bus 102. That is, an ATS may be connected between the common bus 102 and multiple loads (e.g., the third load 104c and the fourth load 104d). The ATS may then be able to selectively couple each of the multiple loads to the common bus 102. In some embodiments, a load control system 100 may have additional or fewer loads and respective ATSs. In some embodiments, a load may include an air-conditioner, emergency safety system, lights, refrigerator, a heating ventilation and cooling (HVAC) system, industrial motor, sump pump, or any other device that consumes electricity to operate.

Each load 103a-d may have a priority. The priority of the loads may be stored or programmed within a memory of the respective ATS 103a-c during installation of the system or updated at a time after installation by an operator. In some embodiments, the priority is assigned by assigning a number to a register within a memory of the ATS. In other embodiments, other techniques for assigning priority may be implemented. In some embodiments, the priority indicates the relative importance (e.g., relative within the load control system 100) of each of the respective loads 104a-d connected to the ATS. For example, the first load 104a may have the highest priority (e.g., priority 1) because the first load 104 is determined to be the most important load within the system (e.g., a pharmaceutical freezer), the second load 104b may have a lower priority (e.g., priority 3) because the second load 104b is determined to be a less important load within the system (e.g., a heating ventilation and cooling (HVAC) system), and the third load 104c may have assigned a higher priority than the second load 104b but lower than the first load 104a (e.g., priority 2) based on the importance of the third load 104c load (e.g., a sump pump). Further, the fourth load 104d may have the lowest (e.g., priority 8) based on the relatively low importance of the fourth load 104d in the load control system 100 (e.g., parking lot lights). In some embodiments, there may be two or more priority levels. In some embodiments, the load control system 100 may have eight levels of priority. One or more of the loads 104a-d may have the same level of priority.

As indicated above, the priority of each respective load 104a-d may be programmed or stored into a memory of the respect ATS and the ATS may use the priority to determine an amount of time to keep a respective load connected to the common bus 102 when a trigger (e.g., fault condition) is detected by the ATS 103a-c. For example, in some implementations, the ATS 103a-c that is connected to the lowest priority load has the shortest amount of time to wait (e.g., pre-defined time) once a trigger is detected (e.g., a fault condition is detected) on the common bus 102 (e.g., via the fourth ATS 103d) before the lowest priority load (e.g., the fourth load 104d) is electrically disconnected from the common bus 102. If the fault condition or trigger persists after the respective load (e.g., the fourth load 104d) is disconnected, then the ATS 103a-c (e.g., the second ATS 103b) connected to the next lowest priority load (e.g., the second load 104b) will disconnect the next lowest priority load after a second determined amount of time (e.g., a second pre-defined time). In some embodiments, the relationship between priority and amount of time to wait (e.g., the pre-defined time) is determined via a programmed function within a memory of each ATS 103a-c. The pre-programmed function between priority and amount of time to wait (e.g., the pre-defined time) may be linear. In some embodiments, the priority is assigned directly as the amount of time to wait (e.g., pre-defined time). In some embodiments, each of the ATSs 103a-c include or are programmed to include a lookup table in memory that is configured to allow the ATS 103a-c to determine the amount of time to wait (e.g., the pre-defined time) based on the assigned priority of the respective load 104a-d.

Figure 2:
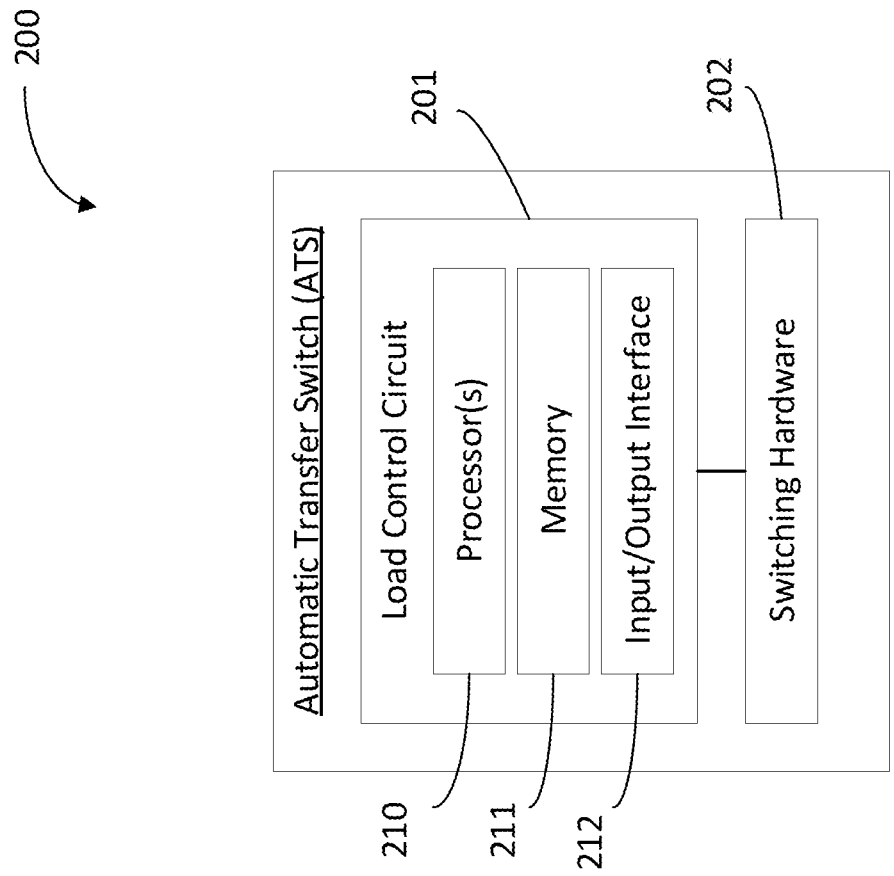
FIG. 2 is a block diagram illustrating an automatic transfer switch (ATS) according to an exemplary embodiment.

Referring to FIG. 2, a block diagram illustrating an ATS 200 is shown according to an exemplary embodiment. The ATS 200 may include a load control circuit 201 and switching hardware 202. In some embodiments the ATS 200 may be implemented or installed as a separate unit or as a part of a load device or system.

The load control circuit 201 may include one or more processors 210, a memory 211, and an input/output interface 212. In some embodiments, the load control circuit 201 may also include application specific integrated circuit (ASICs), or circuitry (e.g., such as buffers, analog to digital converters, filters, etc.) that are integrated with the switching hardware 202 that may assist in performing any of the steps, operations, processes, or methods described herein.

The load control circuit 201 may include one or more circuits, processors 210, and/or hardware components. The load control circuit 201 may implement any logic, functions or instructions to perform any of the operations described herein. The load control circuit 201 can include memory 211 of any type and form that is configured to store executable instructions that are executable by any of the circuits, processors or hardware components. The executable instructions may be of any type including applications, programs, services, tasks, scripts, libraries, processes and/or firmware. The memory 211 may include a non-transitory computable readable medium that is coupled to the processor 210 and stores one or more executable instructions that are configured to cause, when executed by the processor 210, the processor 210 to perform or implement any of the steps, operations, processes, or methods described herein. In some embodiments, the memory 211 is configured to also store an assigned priority, a pre-defined time based on the priority, a functional relationship between the assigned priority and pre-defined time, and/or a look-up table that corresponds the assigned priorities with a pre-defined time.

The input/output interface 212 of the load control circuit 201 may be configured to allow the load control circuit 201 to communicate with or control the switching hardware 212 and/or to allow the load control circuit to monitor (e.g., via one or more electrical sensors) one or more electrical parameters at a first terminal of the ATS 100. In some embodiments, the input/output interface 212 also allows for the communication between ether devices (e.g., a server system or other computing device that may be used to update firmware, software, assigned priorities of the loads, etc.). The input/output interface 212 may be configured to allow for a physical connection (e.g., wired or other physical electrical connection) between the load control circuit 201 and the switching hardware 202 and/or first terminal (e.g., and thereby the common bus 102). Further, the input/output interface 212 may include a wireless interface that is configured to allow wireless communication between other devices (e.g., the energy sources, other ATSs, or a programming device) and/or the switching hardware 202. The wireless communication may include a Bluetooth, wireless local area network (WLAN) connection, radio frequency identification (RFID) connection, or other types of wireless connections. In some embodiments, the input/output interface 212 also allows the load control circuit 201 to connect to the internet (e.g., either via a wired or wireless connection).

The switching hardware 202 includes various hardware and electrical components that are configured to cause the ATS 200 to electrically connect (and/or disconnect) a first terminal (e.g., connected to a common bus 102 or energy source) and a second terminal (e.g., connected to a respective load 104a-d and/or other ATSs). In some embodiments, the switching hardware is further configured to electrically connect (and/or disconnect) the first terminal and a third terminal (e.g., connected to a respective load 104a-d and/or other ATSs). This is, the ATS may be configured to be connected to multiple loads (e.g., a first and second load) and the switching hardware is configured to selectively connect or disconnect each of the multiple loads to the common bus (e.g., via the first terminal).

It should be noted that various other components can be included in the ATS 200 that are not shown for sake of clarity of the present embodiments. These can include various switching components including transistors, contactors, relays, voltage sensors, frequency sensors, solenoids, etc.

Figure 3:
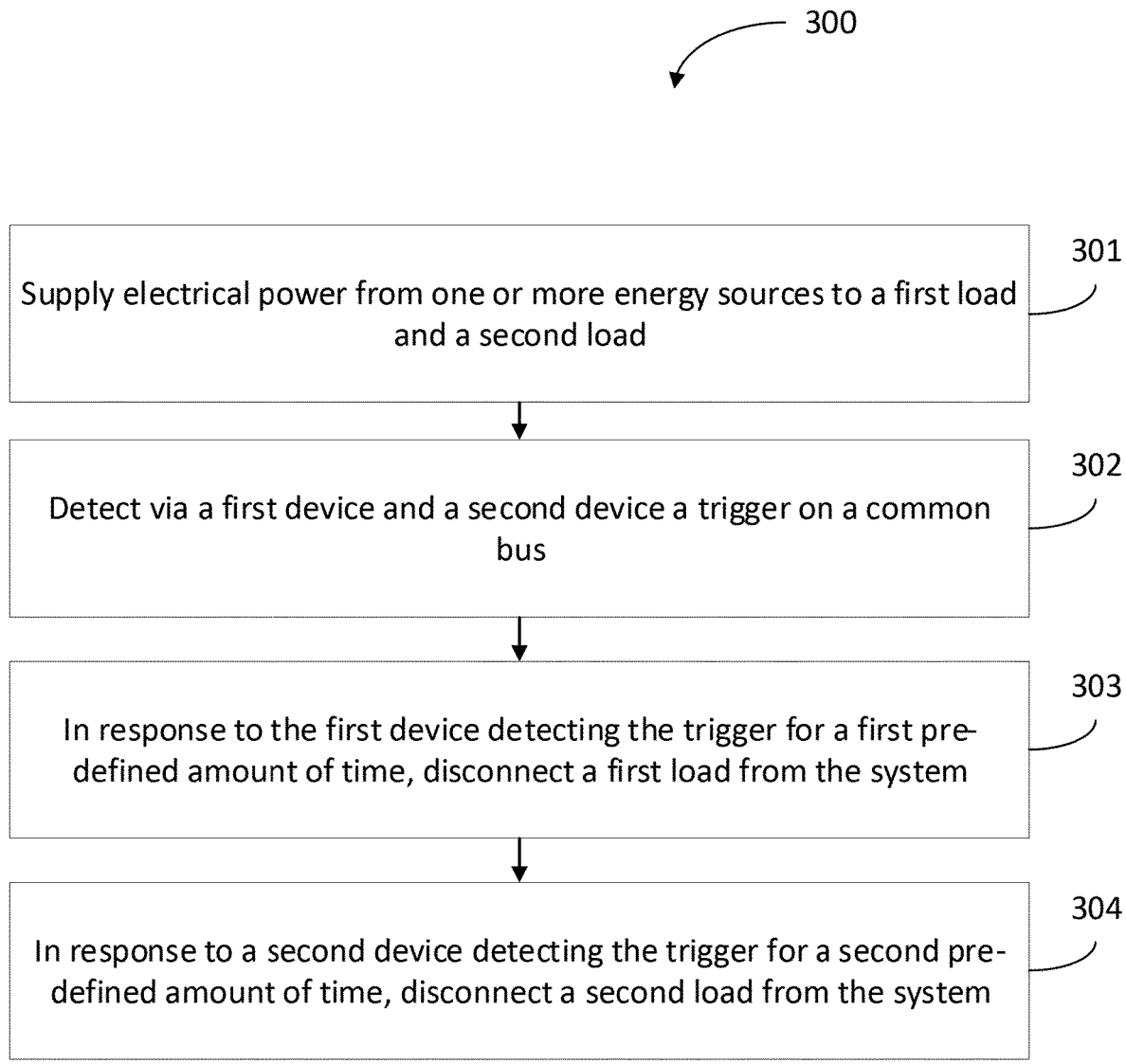
FIG. 3 is a flow diagram illustrating a method of load control is shown according to an exemplary embodiment.

Referring to FIG. 3, a method 300 of load control in a load control system is shown according to an exemplary embodiment. In an operation 301, the system supplies electrical power from one or more energy sources to a first load and a second load. In some embodiments, the system includes multiple energy sources connected to a common bus. The first load is connected to the common bus via a first device (e.g., a first ATS or similar device) that is configured to selectively and electrically connect and disconnect the first load to and from the common bus. Similarly, the second load is connected to the common bus via a second device (e.g., a second ATS or similar device) that is configured to selectively and electrically connect and disconnect the first load to and from the common bus. In some embodiments, both loads are connected to the common bus via a single device (e.g., a single ATS).

In an operation 302, the first device and the second device detect a trigger (e.g., a fault condition) on the common bus. That is, the first device and second detected that an electrical parameter on the common bus is outside of a pre-defined range (e.g., or violates a threshold). For example, the first and second device may have detected that the frequency of the electricity on the common bus is outside of a pre-defined range (e.g., +/−10% of 50 hz or 60 hz, or +/−10% of an root-mean-square voltage) and each begin a respective timer. If the trigger (e.g., fault condition) stops, for example, because the energy sources have remedied the fault condition, then the first and second devices may stop and reset the respective timers.

In an operation 303, in response to the first device detecting the trigger for a first pre-defined amount of time, the first device disconnects the first load. For example, once the timer of the first device exceeds the first pre-defined amount of time, the first device may then disconnect the first load (e.g., via opening contactors) from the common bus. The first pre-defined amount of time may be based on the priority assigned to the first load. For example, in some embodiments, the first load may have been determined to be less important than the second load and thus assigned a lower priority than the second load. The lower priority means that the first pre-defined time (e.g., the pre-defined time of the first device) is lower or smaller than a pre-defined time of the second device. In this way, the system may implement priority based load control without the need for a supervisory (e.g., system-wide) controller.

In some embodiments, he first load was causing the fault condition (e.g., indicated by the trigger) on the common bus. Thus, in such an example, the disconnection of the first load via the first device (e.g., first ATS) may remedy the fault condition, and the second device can detect that the trigger is no longer present and, in response, stop and reset the timer of the second device. In some embodiments, the first device may be configured to wait a pre-defined amount of time and try to reconnect the first load to the common bus at that time. In some embodiments, the first device is configured to leave the first load disconnected from the common bus until an operator intervenes to ensure that there are no issues that should be dealt with before reconnection of the first load to the system.

In an operation 304, in response to the second device detecting the trigger for a second pre-defined amount of time, disconnect the second load. That is, if the disconnection of the first load at operation 303 does not cure or remedy the fault condition (e.g., return the electrical parameter back to the pre-defined range) at the common bus, then after a set amount of time (e.g., set amount of time from when the trigger was detected), the second load is disconnected in an attempt to cure the fault condition. For example, once the timer of the second device exceeds the second pre-defined amount of time (e.g., pre-defined amount of time of the second device), the second device may disconnect the second load (e.g., via opening contactors) from the common bus. In some embodiments, the second pre-defined amount of time is based on the priority assigned to the second device, which may be based on the relative importance of the second load within the system. In some embodiments, the second pre-defined amount of time is determined by the second device (e.g., via a look-up table or function stored in memory) or is directly programmed into a memory of the second device.

In some embodiments, the second device may be configured to wait a pre-defined amount of time (e.g., bases on the priority) and try to reconnect the second load to the common bus at that time. In other embodiments, the second device is configured to leave the second load disconnected from the common bus until an operator intervenes to ensure that there are no issues that should be dealt with before reconnection of the second load to the common bus. In some embodiments, the first and second loads may be connected to a single ATS. The single ATS may disconnect the lower priority load after the first pre-defined amount of time and, if the trigger is still present, disconnect the second load after the second pre-defined amount of time.

Figure 4:
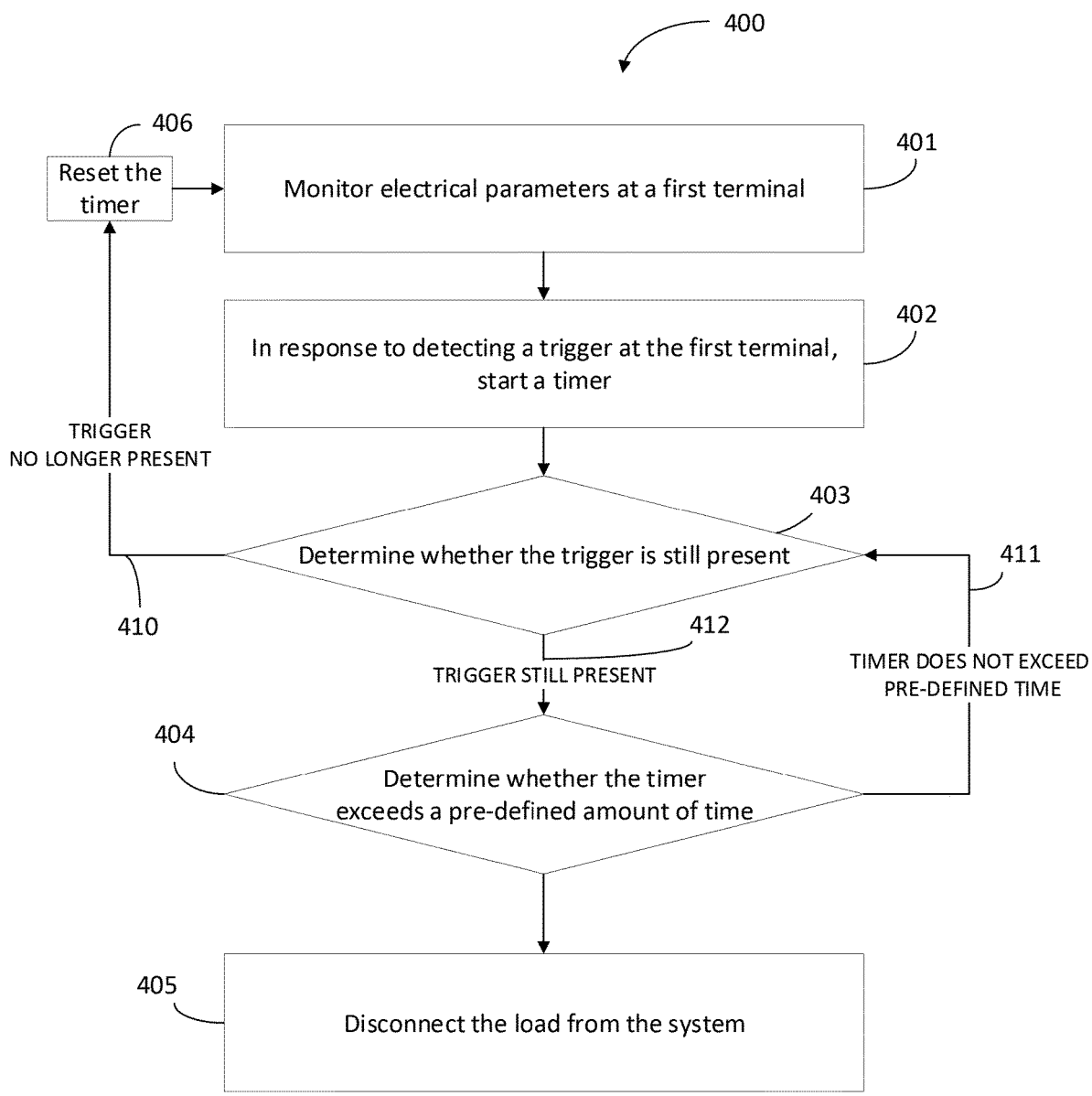
FIG. 4 is a flow diagram illustrating a method of a first device disconnecting a load from a common bus according to an exemplary embodiment.

Referring to FIG. 4, a method 400 of a first device disconnecting a load from a common bus is shown according to an exemplary embodiment. In an operation 401, the first device (e.g., the first ATS) monitors one or more electrical parameters at first terminal of the device (e.g., on the common bus). The electrical parameters that the first device monitors, senses, or detects, may include voltage, frequency, current, power magnitude, or any other parameter of electricity.

In an operation 402, in response to detecting a trigger at the first terminal, the first device starts a timer. For example, a trigger may include a fault condition (e.g., an overload condition). The overload condition may be detected by the first device by the first device determining that a frequency has slowed down beyond a threshold or voltage has dropped below a threshold. That is, the first device may detect the trigger by determining that one or more electrical parameters are beyond a threshold or outside of a pre-defined range. The thresholds or pre-defined ranges may be programmed and/or updated into the memory of the first device. Once the trigger is detected, the first device may start an internal timer that is configured to measure the amount of time that the trigger (e.g., overload condition) is present.

In an operation 403, the first device determines whether the trigger is still present. If the trigger condition is no longer present, then the timer is reset at operation 406 and the method proceeds to operation 401. For example, if the overload condition at the first terminal (e.g., common bus) has been remedied then the timer may be stopped and reset (at operation 406) and the first device may proceed with monitoring the electrical parameters for another trigger (e.g., fault condition). If the trigger is determined to still be present (e.g., the voltage is still below the threshold), then a determination of whether the timer has met or exceeded a pre-defined amount of time at operation 404 is made. For example, if the overload condition is determined to still be present at operation 404, then the first device determines how long the overload condition has been present (e.g., using the timer). If the timer has not met or exceeded the pre-defined amount of time, then the method proceeds to operation 403. In some embodiments, the pre-defined amount of time is based on a priority of a respective load connected to the first device, an assigned priority to the first device, or an assigned pre-defined amount of time within memory of the first device.

If the timer has met or exceeded the pre-defined amount, then a load is disconnected from the system at operation 405. For example, if the overload condition has been present for a time period that exceeds the pre-defined amount of time, then in response, the first device disconnects a respective load connected to the first device from the first terminal (e.g., the common bus terminal). In some embodiments, the first device disconnects the respective load by opening up a contactor or by controlling other various switching hardware.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A device comprising:
a first terminal arranged to connect to a common bus connected with an output of a plurality of energy sources, the plurality of energy sources arranged to connect and output energy directly to the common bus, the energy outputted by the plurality of energy sources having a voltage and a frequency;
a second terminal arranged to connect to one or more first loads;
first switching hardware configured to connect the first terminal to the second terminal; and
a first load control circuit configured to:
monitor, at the first terminal, a plurality of electrical parameters for the energy outputted by the plurality of energy sources on the common bus, the plurality of electrical parameters including the voltage and the frequency of the energy;
detect a condition on the first terminal based on the voltage and the frequency of the plurality of electrical parameters falling outside a pre-determined range; and
in response to detecting the condition for a pre-determined amount of time, cause the first switching hardware to electrically disconnect the first terminal from the second terminal, independently of a second load control circuit causing second switching hardware to electrically disconnect one or more second loads from the common bus.

2. The device of claim 1, wherein the first load control circuit is further configured to determine the pre-determined amount of time based on a priority of the one or more first loads.

3. The device of claim 1, further comprising a third terminal configured to connect to one or more third loads, wherein the first switching hardware is further configured to connect the first terminal and the third terminal.

4. The device of claim 3, wherein the first load control circuit is further configured to, in response to detecting the condition for a second pre-determined amount of time, cause the first switching hardware to electrically disconnect the first terminal from the third terminal.

5. The device of claim 4, wherein the pre-determined amount of time is based on a priority of the one or more first loads and the second pre-determined amount of time is based on a priority of the one or more third loads.

6. The device of claim 1, wherein the first load control circuit is further configured to detect the condition based on the voltage of the plurality of electrical parameters falling below a voltage threshold and the frequency of the plurality of electrical parameters falling below a frequency threshold.

7. The device of claim 1, wherein the condition comprises the frequency or the voltage of electricity on the common bus falling below a lower threshold or exceeding an upper threshold.

8. The device of claim 1, wherein the first load control circuit is further configured to cause, responsive to an absence of the condition for a second pre-determined amount of time subsequent to the detection of the condition, the first switching hardware to electrically reconnect the first terminal with the second terminal.

9. The device of claim 8, wherein the second pre-determined amount of time is based on a priority of the one or more first loads connected to the second terminal.

10. A system comprising:
a plurality of energy sources connected to a common bus, the plurality of energy sources arranged to output energy directly to the common bus, the energy outputted by the plurality of energy sources having a power and a frequency;
a first switch device connected to the common bus and a first load, the first switch device comprising:
first switching hardware; and
a first load control circuit, the first load control circuit configured to:
identify a plurality of electrical parameters for the energy outputted by the plurality of energy sources on the common bus, the plurality of electrical parameters including the power and the frequency of the energy;
detect a first trigger on the common bus based on the power and the frequency of the plurality of electrical parameters each falling outside a respective first pre-determined range; and
in response to detecting the first trigger for a first pre-determined amount of time, cause the first load to electrically disconnect from the common bus; and
a second switch device connected to the common bus and a second load, the first switch device and the second switch device configured to operate individually, the second switch device comprising:
second switching hardware; and
a second load control circuit, the second load control circuit configured to:
identify the plurality of electrical parameters for the energy present on the common bus;
detect a second trigger on the common bus based on the power and the frequency of the plurality of electrical parameters falling outside a second pre-determined range; and
in response to detecting the second trigger for a second pre-determined amount of time, cause the second load to electrically disconnect from the common bus.

11. The system of claim 10, wherein the first pre-determined amount of time is less than the second pre-determined amount of time, and wherein a priority of the first load is less than a priority of the second load.

12. The system of claim 10, wherein the first load control circuit of the first switch device is further configured to identify the plurality of electrical parameters comprising a combination of a voltage, a current, and the frequency.

13. The system of claim 12, wherein the second load control circuit of the second switch device is further configured to identify the plurality of electrical parameters comprising the combination of the voltage, the current, and the frequency.

14. The system of claim 13, wherein the first load control circuit is further configured to detect the first trigger based on the power falling below a first power threshold and the frequency falling below a first frequency threshold, and
wherein the second load control circuit is further configured to detect the second trigger based on the power falling below a power threshold and the frequency falling below a second frequency threshold.

15. The system of claim 10, wherein a priority of the first load is stored within a memory of the first switch device, and a priority of the second load is stored within a memory of the second switch.

16. The system of claim 10, wherein the first load control circuit of the first switch device is further configured to cause the first load to electrically reconnect with the common bus, responsive to an absence of the first trigger for a third pre-determined amount of time subsequent to the detection of the first trigger, independent of the second load control circuit of the second switch device.

17. The system of claim 10, wherein the first switch device further comprises a first terminal coupled with the common bus and a second terminal coupled with the first load, and wherein the first switching hardware is arranged to be coupled between the first terminal and the second terminal, and wherein the second switch device further comprises a third terminal coupled with the common bus and a fourth terminal coupled with the second load, and wherein the second switching hardware is arranged to be coupled between the third terminal and the fourth terminal.

18. A method of controlling load conditions on a power grid comprising:

connecting a plurality of energy sources directly to a common bus of the power grid, wherein the plurality of energy sources are arranged to output energy directly to the common bus, the energy outputted by the plurality of energy sources having a current and a frequency;

acquiring, via a first device, a plurality of electrical parameters for the energy on the common bus of the power grid, wherein the first device is connected in series to the common bus and a first load, the plurality of electrical parameters including the current and the frequency of the energy;

detecting, via the first device, a condition on the common bus based on the current of the plurality of electrical parameters falling outside a pre-determined range and the frequency of the plurality of electrical parameters falling below a predetermined threshold; and in response to detecting the condition for a pre-determined amount of time, disconnecting, via the first device, the first load from the common bus, independently of a second device connected in series between the common bus and a second load.

19. The method of claim 18, further comprising:

detecting, via the second device, the condition on the common bus, wherein the second device is connected in series to the common bus and the second load;

in response to detecting the condition for a second pre-determined amount of time, disconnecting, via the second device, the second load from the common bus.

20. The method of claim 18, further comprising:

detecting, via the first device, the condition on the common bus of the power grid, wherein the first device is connected in series to the common bus and a third load; and in response to detecting the condition for a second pre-determined amount of time, disconnecting, via the first device, the third load from the common bus.

* * * * *